(12) United States Patent
Xie et al.

(10) Patent No.: US 7,031,993 B1
(45) Date of Patent: Apr. 18, 2006

(54) METHOD AND APPARATUS FOR FAST NATURAL LOG(X) CALCULATION

(75) Inventors: Min Xie, Waukesha, WI (US); Sharon X. Wang, Brookfield, WI (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 0 days.

(21) Appl. No.: 09/507,521

(22) Filed: Feb. 18, 2000

(51) Int. Cl.
*G06F 1/02* (2006.01)

(52) U.S. Cl. ............................................. 708/277
(58) Field of Classification Search ............. 708/290, 708/204, 277, 499, 272, 512, 495; 380/30
See application file for complete search history.

(56) References Cited

U.S. PATENT DOCUMENTS

| | | | |
|---|---|---|---|
| 3,813,529 A * | 5/1974 | Bartlett ...................... 708/290 |
| 4,718,030 A * | 1/1988 | Tsutsumi .................... 708/276 |
| 5,068,816 A * | 11/1991 | Noetzel ...................... 708/270 |
| 5,184,317 A * | 2/1993 | Pickett ........................ 708/272 |
| 5,345,381 A * | 9/1994 | Wallschlaeger ............. 708/277 |
| 5,365,465 A * | 11/1994 | Larson ........................ 708/204 |
| 5,481,583 A * | 1/1996 | Heuscher ....................... 378/4 |
| 5,546,333 A * | 8/1996 | Smith .......................... 380/30 |
| 5,570,310 A * | 10/1996 | Smith .......................... 380/30 |
| 5,600,581 A * | 2/1997 | Dworkin et al. ............. 341/75 |
| 5,629,780 A * | 5/1997 | Watson ........................ 380/30 |
| 5,667,937 A | 9/1997 | Lawton et al. |
| 5,831,878 A * | 11/1998 | Ishida ........................ 708/204 |
| 5,886,911 A * | 3/1999 | Yang .......................... 708/290 |
| 5,941,939 A * | 8/1999 | Pan et al. .................... 708/499 |
| 5,951,629 A * | 9/1999 | Wertheim et al. ........... 708/277 |
| 6,055,553 A * | 4/2000 | Kantabutra ................. 708/277 |
| 6,078,683 A | 6/2000 | Denison et al. |
| 6,111,985 A | 8/2000 | Hullender et al. |
| 6,173,029 B1 * | 1/2001 | Xie et al. .................... 378/901 |
| 6,234,294 B1 | 5/2001 | Defeo et al. |
| 6,363,405 B1 * | 3/2002 | Loginov ...................... 708/270 |
| 6,567,831 B1 * | 5/2003 | Loginov ...................... 708/290 |
| 2001/0044815 A1 * | 11/2001 | Inoue et al. |

* cited by examiner

*Primary Examiner*—Kakali Chaki
*Assistant Examiner*—Chat C. Do
(74) *Attorney, Agent, or Firm*—Carl B. Horton, Esq; Armstrong Teasdale LLP

(57) ABSTRACT

A method for computing a natural logarithm function includes partitioning a mantissa region between 1 and 2 into N equally spaced sub-regions; precomputing a reference point $a_i$ of each of the N equally spaced sub-regions, where $i=0, \ldots, N-1$; selecting N sufficiently large so that, within each sub-region, a first degree polynomial in m computes log(m) to within a preselected degree of accuracy for any m within the sub-region, where m is a mantissa of a binary floating point representation of a variable x; and computing a value of log(x) for a binary floating point representation of x stored in a memory of a computing device utilizing the first degree polynomial in m.

24 Claims, 3 Drawing Sheets

METHOD AND APPARATUS FOR FAST NATURAL LOG(X) CALCULATION

BACKGROUND OF THE INVENTION

The invention relates generally to methods and apparatus for computing a computationally intensive algorithm, and more specifically to a method and apparatus for computing log(x), or equivalently, −log(x), in a manner that is particularly useful for computed tomographic image processing and other applications.

In at least one known computed tomography (CT) imaging system configuration, an x-ray source projects a fan-shaped beam which is collimated to lie within an X-Y plane of a Cartesian coordinate system and generally referred to as the "imaging plane." The x-ray beam passes through the object being imaged, such as a patient. The beam, after being attenuated by the object, impinges upon an array of radiation detectors. The intensity of the attenuated beam radiation received at the detector array is dependent upon the attenuation of the x-ray beam by the object. Each detector element of the array produces a separate electrical signal that is a measurement of the beam attenuation at the detector location. The attenuation measurements from all the detectors are acquired separately to produce a transmission profile.

In known third generation CT systems, the x-ray source and the detector array are rotated with a gantry within the imaging plane and around the object to be imaged so that the angle at which the x-ray beam intersects the object constantly changes. A group of x-ray attenuation measurements, i.e., projection data, from the detector array at one gantry angle is referred to as a "view." A "scan" of the object comprises a set of views made at a different gantry angles, or view angles, during one revolution of the x-ray source and detector. In an axial scan, the projection data is processed to construct an image that corresponds to a two dimensional slice taken through the object. One method for reconstructing an image from a set of projection data is referred to in the art as the filtered back projection technique. This process converts the attenuation measurements from a scan into intergers called "CT numbers" or "Hounsfield units," which are used to control the brightness of a corresponding pixel on a cathode ray tube display.

The negative natural logarithm function −log(x) is an important yet computationally intensive algorithm in computed tomographic (CT) image processing. In known systems, a 5th order polynomial is used to approximate the function. However, this polynomial still consumes more than 20% of the total image processing time and generates a relatively large approximation error and error standard deviation.

A positive floating point variable x can be represented by an expression written as:

$$x = m \times 2^e \quad (1)$$

where m ($1 \leq m < 2$) is a mantissa and e is a binary exponent.

Using equation (1), −log(x) can be written as:

$$y = -\log(x) = -\log(m) - e \times \log(2) \quad (2)$$

The following equation uses a finite order polynomial to approximate log(m) in a region $1 \leq m < 2$. Generally speaking, the higher the order of the polynomial, the better the approximation will be, but the computational load is in proportion to the order of the polynomial. For example, a 5th order polynomial presently used is written as:

$$\log(m) \approx (a_0 + a_1 m + a_2 m^2 + a_3 m^3 + a_4 m^4 + a_5 m^5) \quad (3a)$$

or as:

$$y = -\log(x) \approx -(a_0 + m(a_1 + m(a_2 + m(a_3 + m(a_4 + a_5 m))))) + e \times a_6 \quad (3b)$$

In equation (3b), $a_0 \sim a_6$ are precalculated constants. To compute −log(x), six additions and six multiplications are required, plus mantissa and exponent extractions.

To process images more efficiently and accurately, it would be desirable to provide methods and apparatus to reduce the complexity of the approximation used to calculate −log(x) while achieving numerical accuracy consistent with IEEE (Institute of Electrical and Electronic Engineers) floating-point precision.

BRIEF SUMMARY OF THE INVENTION

There is therefore provided, in one embodiment of the present invention, a method for computing a natural logarithm function that includes steps of: partitioning a mantissa region between 1 and 2 into N equally spaced sub-regions; precomputing centerpoints $a_i$ of each of the N equally spaced sub-regions, where $i=0, \ldots, N-1$; selecting N sufficiently large so that, for each sub-region, a first degree polynomial in m computes log(m) to within a preselected degree of accuracy for any m within the sub-region, where m is a mantissa of a binary floating point representation of a variable; and computing a value of log(x) for a binary floating point representation of x stored in a memory of a computing device utilizing the first degree polynomial in m.

It will be seen that this embodiment and others described herein reduce the complexity of approximations used to calculate natural logarithms while achieving numerical accuracy consistent with IEEE floating point precision.

DETAILED DESCRIPTION OF THE INVENTION

Figure 1:
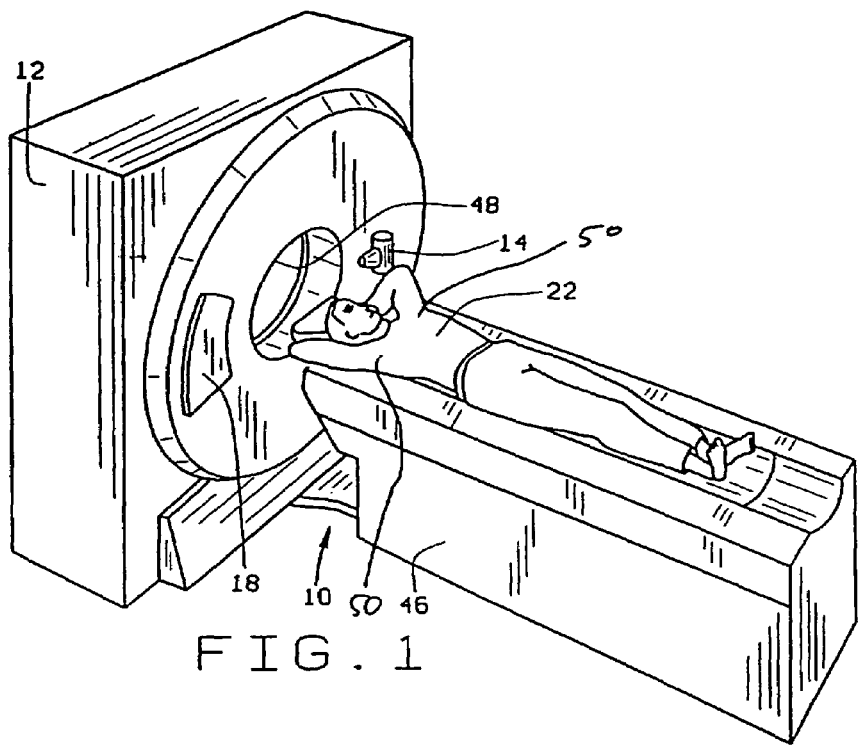
FIG. 1 is a pictorial view of a CT imaging system.
Figure 2:
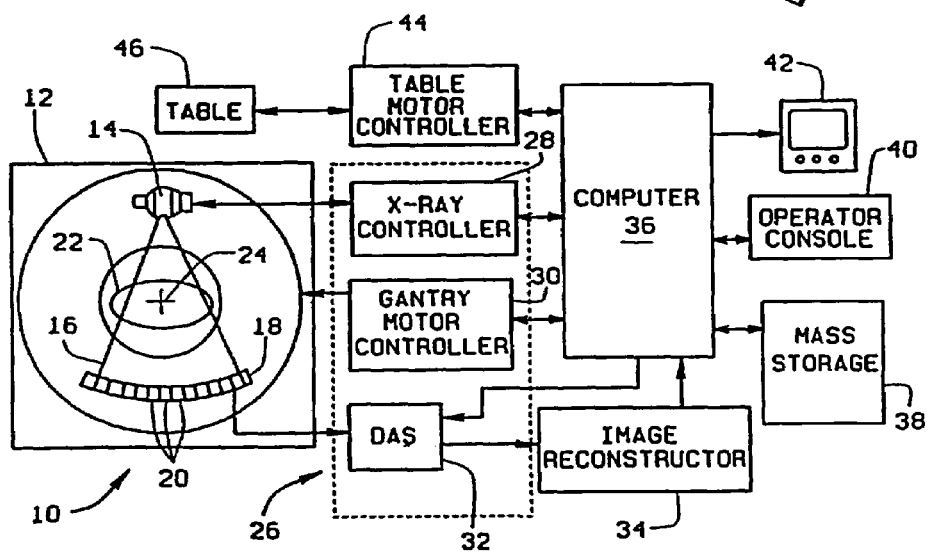
FIG. 2 is a block schematic diagram of the system illustrated in FIG. 1.

Referring to FIGS. 1 and 2, a computed tomography (CT) imaging system 10 is shown as including a gantry 12 representative of a "third generation" CT scanner. Gantry 12 has an x-ray source 14 that projects a beam of x-rays 16 toward a detector array 18 on the opposite side of gantry 12. Detector array 18 is formed by detector elements 20 which together sense the projected x-rays that pass through an object 22, for example a medical patient. Detector array 18 may be fabricated in a single slice or multi-slice configuration. Each detector element 20 produces an electrical signal that represents the intensity of an impinging x-ray beam and hence the attenuation of the beam as it passes through patient 22. During a scan to acquire x-ray projection data, gantry 12 and the components mounted thereon rotate about a center of rotation 24.

Rotation of gantry 12 and the operation of x-ray source 14 are governed by a control mechanism 26 of CT system 10. Control mechanism 26 includes an x-ray controller 28 that provides power and timing signals to x-ray source 14 and a gantry motor controller 30 that controls the rotational speed and position of gantry 12. A data acquisition system (DAS) 32 in control mechanism 26 samples analog data from detector elements 20 and converts the data to digital signals for subsequent processing. An image reconstructor 34 receives sampled and digitized x-ray data from DAS 32 and performs high speed image reconstruction. The reconstructed image is applied as an input to a computer 36 which stores the image in a mass storage device 38.

Computer 36 also receives commands and scanning parameters from an operator via console 40 that has a keyboard. An associated cathode ray tube display 42 allows the operator to observe the reconstructed image and other data from computer 36. The operator supplied commands and parameters are used by computer 36 to provide control signals and information to DAS 32, x-ray controller 28 and gantry motor controller 30. In addition, computer 36 operates a table motor controller 44 which controls a motorized table 46 to position patient 22 in gantry 12. Particularly, table 46 moves portions of patient 22 through gantry opening 48.

Figure 3:
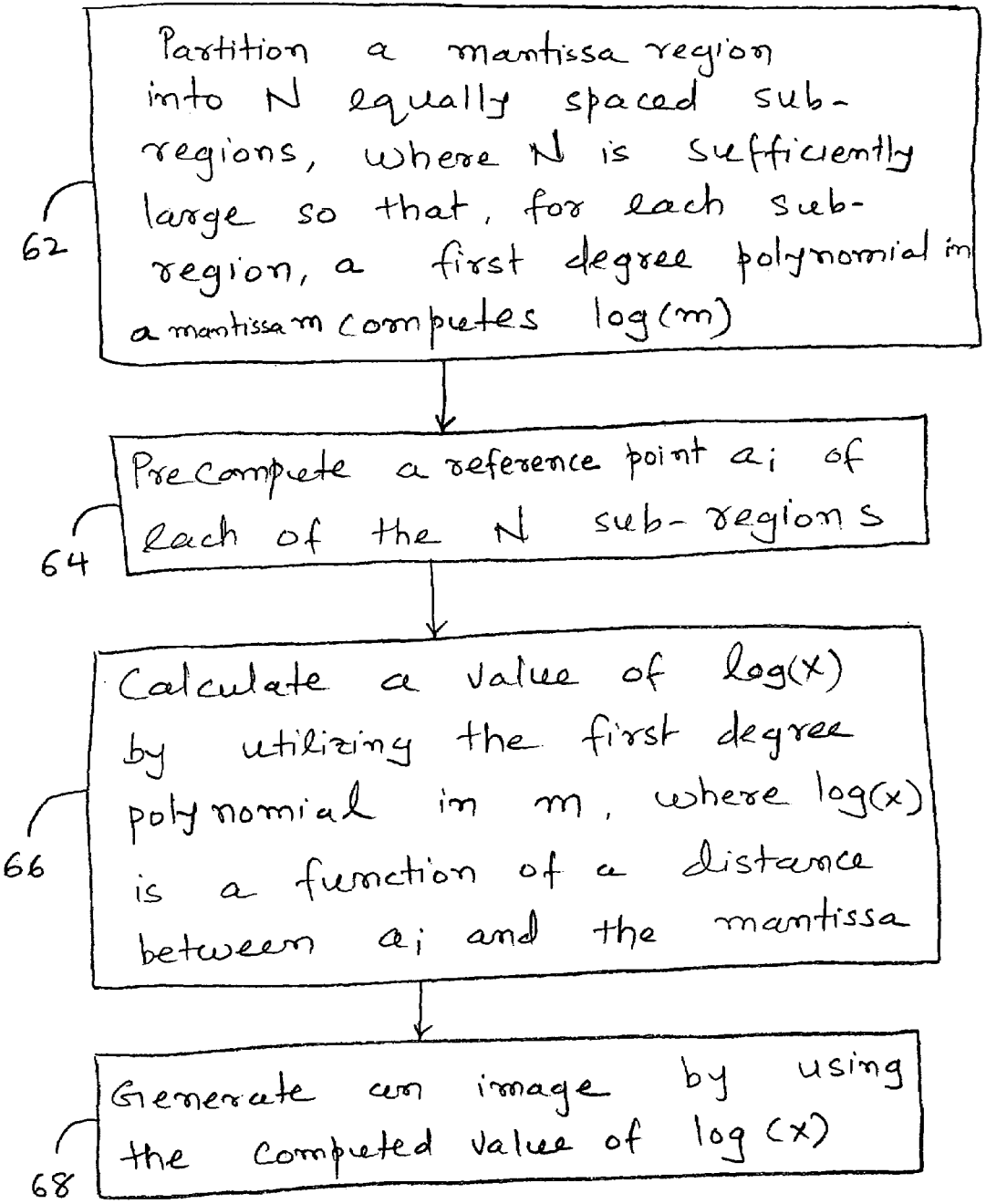
FIG. 3 is a flowchart of an embodiment of a method for fast natural log(x) calculation.

FIG. 3 is a flowchart of an embodiment of a method for fast natural log(x) calculation. When executing the method, which is described in detail below, computer 36 partitions 62 a mantissa region between 1 and 2 into N equally spaced sub-regions and precomputes 64 a reference point $a_i$ of each of the N equally spaced sub-regions, where i=0, . . . ,N-1. Computer 36 selects 62 N sufficiently large so that, for each sub-region, a first degree polynomial in m computes log(m) to within a preselected degree of accuracy for any m within the sub-region, where m is a binary mantissa of a binary floating point representation of a variable x. Computer 36 calculates 66 a value of log(x) for a binary floating point representation of x stored in mass storage device 38 of computer 36 utilizing the first degree polynomial in m, where log(x) is a function of a distance between $a_i$ and the mantissa. Image reconstructor 34 generates 68 an image by using the computed value of log(x).

A negative natural logarithm function -log(m) is used by image reconstructor 34 to generate images. In one embodiment of the invention, the function log(m) of equation (3a) above is written as:

$$\log(m) = \log(a) + \frac{\log(m)'|_{m=a}}{1!}(m-a) + \qquad (4a)$$

$$\frac{\log(m)''|_{m=a}}{2!}(m-a)^2 + \ldots + \frac{\log(m)^{(n)}|_{m=a}}{N!}(m-a)^n$$

or as:

$$\log(m) \approx \log(a) + \frac{(m-a)}{a} - \frac{(m-a)^2}{2a^2} + \ldots \qquad (4b)$$

where a is a known reference point. The error of the above function is written as:

$$\text{error} \leq \left| \frac{\log(m)^{(n+1)}|_{m=a}}{N!}(m-a)^{n+1} \right| \qquad (5)$$

Because (m-a)<1, there are two ways to minimize the error. One way is to increase the order of the approximation, and the other is to minimize the distance from m to a. Because mantissa m is between 1 and 2, in one embodiment of the present invention, the region between 1 and 2 is partitioned into N equally spaced sub-regions. Centers of each of the sub-regions are precomputed and used as reference points in equations (4a) and (4b). By partitioning into a sufficiently large number of sub-regions, a low order polynomial function produces sufficient accuracy for CT imaging purposes. In particular, by selecting a sufficiently large number of sub-regions, for any m within any particular sub-region, log(m) is computed by a first-degree polynomial to within a preselected degree of accuracy within that sub-region. For example, computer 36 uses the first degree polynomial in m to compute values of log(x) for binary floating point representations of x stored in its memory.

A log(m) approximation that is based on a first order polynomial with a set of precalculated reference points is written as follows:

$$\log(m) \approx \log(a_i) + \frac{(m-a_i)}{a_i}; \quad i=0, \ldots, N-1; \ 1 \leq a_i < 2 \qquad (6)$$

where $a_i$ is a closest reference point to a given mantissa m.

Figure 4:
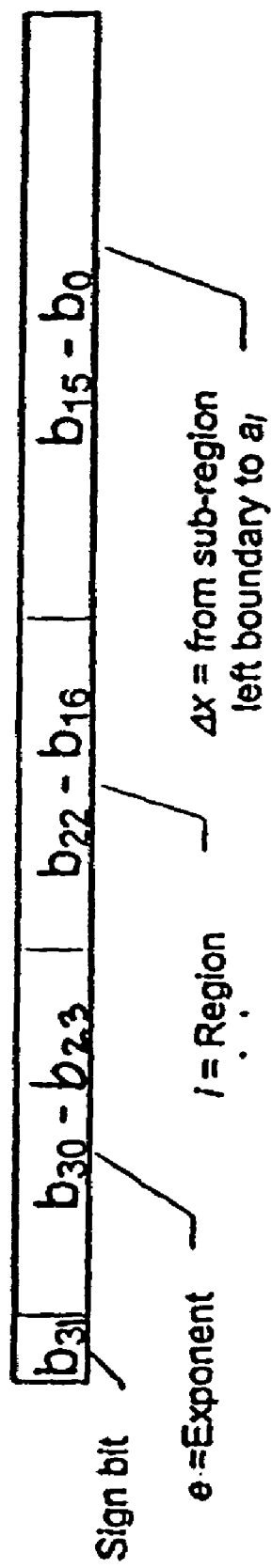
FIG. 4 is a representation of a variable stored in IEEE single-precision binary floating point format, partitioned as in one embodiment of the invention.

Rather than compute a sub-region index using i=round ((m-1)×N), which would require six operations, one embodiment of the present invention reduces computation load as follows. A partitioning algorithm divides the mantissa of a binary floating point variable in memory into two sub-regions. The sub-regions have index i and Δx, where Δx is a distance from mantissa m to reference point $a_i$. Indices i and Δx are directly extracted from an IEEE floating-point variable stored in a computer system, thereby reducing computation time and improving accuracy. In one embodiment, mantissa partitioning occurs as illustrated in FIG. 4, in which index i ranges from 0 to 127 and each region represents information extracted from the datum shown in FIG. 4. More particularly, in a single precision IEEE floating point variable, $b_{31}$ represents a sign bit, $b_{30}$ the most significant bit of exponent e, $b_{23}$ the least significant bit of exponent e, $b_{22}$ the most significant bit of mantissa m, and $b_0$ the least significant bit of mantissa m. (If it is desired to use a different designation for the numbering of bits b, those skilled in the art can make the appropriate changes required in the description for notational consistency.) In this single precision embodiment, exponent e is extracted directly from bits $b_{30}$ to $b_{23}$; region i is extracted directly from bits $b_{22}$ to $b_{16}$; and Δx (a distance from mantissa m to reference point $a_i$) is extracted directly from bits $b_{15}$ to $b_0$.

Using the extraction illustrated in FIG. 4, a maximum error of equation (6) in each sub-region is estimated by an expression written as:

$$\text{error} \leq \frac{1}{2a_i^2} \times \left(\frac{1}{2N}\right)^2; \quad i=0, \ldots, N-1; \ 1 \leq a_i < 2 \qquad (7a)$$

From equation (7a), it is seen that the error of the first order approximation is always positive, so that the error is biased. To minimize the maximum error, in one embodiment the mean error of equation (7a) is subtracted from equation (6). Thus, the unbiased error is written as:

$$|\text{error}| \leq \left(\frac{1}{4Na_i}\right)^2; \quad i=0,\ldots,N-1; \quad 1 \leq a_i < 2 \qquad (7b)$$

Subtracting equation (7b) from equation (6) results in an unbiased first order polynomial function for $-\log(x)$ written as:

$$y = -\log(x) \approx b_i + c_i \Delta x + e \times \log(2) \qquad (8)$$

for $i=0,\ldots,N-1$ $$b_i = -\log(a_i) + \left(\frac{1}{4a_i N}\right)^2 - \left(1 + \frac{1}{2N}\right)\frac{1}{a_i}. \qquad (9)$$

$$c_i = -1/a_i$$

where $$a_i = 1 + \frac{i+0.5}{N},$$

and $\Delta x$ is a distance from mantissa m to reference point $a_i$. The value $\Delta x$ is extracted directly from an IEEE floating point datum. In one embodiment, log(2) and the $b_i$ and $c_i$ are pre-calculated and saved in a look-up table at initialization time. In one embodiment, the values $b_i$ are determined from precomputed values of log($a_i$). For purposes of comparison, computation of equation (8) requires only ⅓ as much time as is required to calculate the 5th order approximation of equation (3b).

Taking into account the relationship of m and $\Delta x$, an approximation to log(x) (or equivalently $-\log(x)$) is computed using a polynomial of first degree in m and a precomputed value of log($a_i$).

In one embodiment of the present invention, image reconstructor 34 is configured with software or firmware to compute logarithms using one or more of the methods of the present invention, when CT imaging system 10 images an object from acquired projection data.

From the preceding description of various embodiments of the present invention, it is evident that the complexity of the approximation used to calculate $-\log(x)$ is reduced, while numerical accuracy consistent with IEEE (Institute of Electrical and Electronic Engineers) floating-point precision is maintained. Thus, images processed by CT imaging system 10 are processed more efficiently, and without loss of detail. Although particular embodiments of the invention have been described and illustrated in detail, it is to be clearly understood that the same is intended by way of illustration and example only and is not to be taken by way of limitation. For example, embodiments of the improved computation for log(x) and $-\log(x)$ can be incorporated into any computational system requiring increased efficiency while maintaining computational accuracy. In addition, the present invention is suitable for use with floating point numbers having greater or lesser precision than those discussed in detail in this description. The modifications necessary to accommodate such different precisions will be apparent to those skilled in the art, once the invention described herein is thoroughly understood. Accordingly, the spirit and scope of the invention are to be limited only by the terms of the appended claims and legal equivalents.

What is claimed is:

1. A method for computing an approximation of a natural logarithm function comprising the steps of:
    partitioning an interval between 1 and 2 into N equally spaced sub-regions;
    precomputing a reference point $a_i$ of each of the N equally spaced sub-regions, where $i=0,\ldots,N-1$;
    selecting N sufficiently large so that, for each sub-region, a first degree polynomial in m computes log(m) to within a preselected degree of accuracy for any m within the sub-region, where m is a binary mantissa of a binary floating point representation of a variable x;
    computing a value of log(x) for a binary floating point representation of x stored in a memory of a computing device utilizing the first degree polynomial in the binary mantissa m, wherein log(x) is a function of a distance between the reference point $a_i$ and the binary mantissa m; and
    generating an image by using the computed value of log(x), wherein x has a binary exponent e in addition to the binary mantissa m;
    and further wherein computing a value of log(x) for the binary floating point representation of x comprises the steps of:
    partitioning the binary mantissa m of a binary representation of x in a memory, the representation of x including a binary exponent e and the binary mantissa m, wherein a first, most significant part of the partition corresponds to a region i and a second, less significant part of the partition corresponds to a region $\Delta x$, where $\Delta x$ is a distance from the binary mantissa m to the reference point $$a_i = 1 + \frac{i+0.5}{N};$$

computing an approximation to log(x), using the first degree polynomial in the binary mantissa m and a precomputed value of log($a_i$), wherein computing an approximation to log(x) comprises the step of computing an approximation written as:

$$y = -\log(x) \approx b_i + c_i \Delta x + e \times \log(2)$$

for $i=0,\ldots,N-1$
where:

$$b_i = -\log(a_i) + \left(\frac{1}{4a_i N}\right)^2 - \left(1 + \frac{1}{2N}\right)\frac{1}{a_i}; \quad \text{and}$$

$$c_i = -1/a_i;$$

precomputing a value for log(2); and
for each i, precomputing each value of $b_i$ and $c_i$.

2. A method in accordance with claim 1 further comprising the step of storing the precomputed values of $b_i$ and $c_i$ in a look-up table.

3. A method for computing an approximation of a natural logarithm function comprising the steps of:
    partitioning an interval between 1 and 2 into N equally spaced sub-regions;
    precomputing a reference point $a_i$ of each of the N equally spaced sub-regions, where $i=0,\ldots,N-1$;

selecting N sufficiently large so that, for each sub-region, a first degree polynomial in m computes log(m) to within a preselected degree of accuracy for any m within the sub-region, where m is a binary mantissa of a binary floating point representation of a variable x;

computing a value of log(x) for a binary floating point representation of x stored in a memory of a computing device utilizing the first degree polynomial in the binary mantissa m, wherein log(x) is a function of a distance between the reference point $a_i$ and the binary mantissa m;

generating an image by using the computed value of log(x), wherein x has a binary exponent e in addition to the binary mantissa m;

and further wherein computing a value of log(x) for the binary floating point representation of x comprises the steps of:

partitioning the binary mantissa m of a binary representation of x in a memory, the representation of x including a binary exponent e and the binary mantissa m, wherein a first, most significant part of the partition corresponds to a region i and a second, less significant part of the partition corresponds to a region $\Delta x$, where $\Delta x$ is a distance from the binary mantissa m to the reference point $$a_i = 1 + \frac{i + 0.5}{N}; \text{ and}$$

computing an approximation to log(x), using the first degree polynomial in the binary mantissa m and a precomputed value of log($a_i$);

and further wherein computing an approximation to log (x) comprises the step of computing an approximation written as:

$$y = -\log(x) \approx b_i + c_i \Delta x + e \times \log(2)$$

for i=0, . . . ,N−1
where:

$$b_i = -\log(a_i) + \left(\frac{1}{4a_iN}\right)^2 - \left(1 + \frac{1}{2N}\right)\frac{1}{a_i}; \text{ and}$$

$c_1 = -1/a_i;$ precomputing a value for log(2); and
for each i, precomputing each value of $b_i$ and $c_i$; and
said method utilized in a computed tomography (CT) scanner configured to generate an image of an object from acquired projection data of the object.

4. A method in accordance with claim 3 further comprising the step of storing the precomputed values of $b_i$ and $c_i$ in a look-up table.

5. A computing device comprising a memory in which binary floating point representations of particular numbers are stored, said device being configured to:

partition an interval between 1 and 2 into N equally spaced sub-regions;

precompute a reference point $a_i$ of each of the N equally spaced sub-regions, where i=0, . . . ,N−1, wherein N is sufficiently large so that, within each sub-region, a first degree polynomial in m computes log(m) to within a preselected degree of accuracy for any m within the sub-region, where m is a mantissa of a binary floating point representation of a variable x;

compute a value of log(x) for a binary floating point representation of x stored in said memory utilizing the first degree polynomial in the binary mantissa m, wherein log(x) is a function of a distance between the reference point $a_i$ and the binary mantissa m;

generate an image by using the computed value of log(x);

wherein x has a binary exponent e in addition to the binary mantissa m and wherein said device being configured to compute a value of log(x) for the binary floating point representation of x comprises said device being configured to:

partition the binary mantissa m of a binary representation of x in a memory of said device, the representation of x including a binary exponent e and the binary mantissa m, wherein a first, most significant part of the partition corresponds to a region i and a second, less significant part of the partition corresponds to a region $\Delta x$, where $\Delta x$ is a distance from the binary mantissa m to the reference point $$a_i = 1 + \frac{i + 0.5}{N}; \text{ and}$$

compute an approximation to log(x), using a polynomial of first degree in m and a precomputed value of log($a_i$);

and further wherein said device being configured to compute the approximation to log(x) comprises said device being configured to compute an approximation written as:

$$\log(m) \approx \log(a_i) + \frac{(m - a_i)}{a_i};$$

where the reference point $a_i$ is a closest reference point to the binary mantissa m; and $1 \leq a_i < 2.$ 6. A computing device in accordance with claim 5 wherein x is represented by a 32-bit representation having a sign bit, an 8-bit exponent, and a 23-bit binary mantissa having bits $b_{22}$ to $b_0$ in order of significance with $b_{22}$ being a bit of greatest significance; and wherein said device being configured to partition the binary mantissa m comprises said device being configured to select a first group of bits $b_{22}$ through $b_{16}$ as index i and bits $b_{15}$ through $b_0$ as $\Delta x$.

7. A computing device in accordance with claim 5 in a computed tomography (CT) scanner and utilized by said CT scanner for calculating logarithms when said CT scanner generates an image of an object from acquired projection data of the object.

8. A computing device in accordance with claim 7 wherein said CT scanner utilizes said computing device to calculate natural logarithm in an image reconstructor to generate the image of the object.

9. A computing device in accordance with claim 5, said computing device further configured to use the value of log(x) to process at least one image of an object of interest.

10. A computing device in accordance with claim 5 wherein the reference point $a_i$ is a centerpoint of each of the N equally spaced sub-regions.

11. A computing device in a computed tomography (CT) scanner and utilized by said CT scanner for calculating logarithms when said CT scanner generates an image of an object from acquired projection data of the object, said computing device comprising a memory in which binary floating point representations of particular numbers are stored, said device being configured to:
partition an interval between 1 and 2 into N equally spaced sub-regions;
precompute a reference point $a_i$ of each of the N equally spaced sub-regions, where i=0, . . . ,N−1, wherein N is sufficiently large so that, within each sub-region, a first degree polynomial in m computes log(m) to within a preselected degree of accuracy for any m within the sub-region, where m is a mantissa of a binary floating point representation of a variable x;
compute a value of log(x) for a binary floating point representation of x stored in said memory utilizing the first degree polynomial in the binary mantissa m, wherein log(x) is a function of a distance between the reference point $a_i$ and the binary mantissa m; and
generate an image by using the computed value of log(x);
wherein x is stored with a binary exponent e in addition to the binary mantissa m;
and further wherein said device being configured to compute a value of log(x) for the binary floating point representation of x comprises said device being configured to:
partition the binary mantissa m of a binary representation of x in a memory, the representation of x including a binary exponent e and the binary mantissa m, wherein a first, most significant part of the partition corresponds to a region i and a second, less significant part of the partition corresponds to a region Δx, where Δx is a distance from mantissa m to reference point $$a_i = 1 + \frac{i+0.5}{N}; \text{ and}$$

compute an approximation to log(x), using a polynomial of first degree in m and a precomputed value of log($a_i$);
and further wherein said device being configured to compute an approximation to log(x) comprises said device being configured to compute an approximation written as:

$$y=-\log(x) \approx b_i+c_i \Delta x+e \times \log(2)$$

for i=0, . . . ,N−1
where:

$$b_i = -\log(a_i) + \left(\frac{1}{4a_iN}\right)^2 - \left(1 + \frac{1}{2N}\right)\frac{1}{a_i}; \text{ and}$$

$$c_i=-1/a_i;$$

and said device is further configured to precompute a value for log(2); and
for each i, to precompute each value of $b_i$ and $c_i$.
12. A computing device in accordance with claim 11 further configured to store the precomputed values of $b_i$ and $c_i$ in a look-up table.
13. A computing device comprising a memory in which binary floating point representations of particular numbers are stored, said device being configured to:
partition an interval between 1 and 2 into N equally spaced sub-regions;
precompute a reference point $a_i$ of each of the N equally spaced sub-regions, where i=0, . . . ,N−1, wherein N is sufficiently large so that, within each sub-region, a first degree polynomial in m computes log(m) to within a preselected degree of accuracy for any m within the sub-region, where m is a mantissa of a binary floating point representation of a variable x;
compute a value of log(x) for a binary floating point representation of x stored in said memory utilizing the first degree polynomial in the binary mantissa m, wherein log(x) is a function of a distance between the reference point $a_i$ and the binary mantissa m; and
generate an image by using the computed value of log(x), wherein x has a binary exponent e in addition to the binary mantissa m;
and wherein said device being configured to compute a value of log(x) for the binary floating point representation of x comprises said device being configured to:
partition the binary mantissa m of a binary representation of x in a memory of said device, the representation of x including a binary exponent e and the binary mantissa m, wherein a first, most significant part of the partition corresponds to a region i and a second, less significant part of the partition corresponds to a region Δx, where Δx is a distance from the binary mantissa m to the reference point $$a_i = 1 + \frac{i+0.5}{N}; \text{ and}$$

compute an approximation to log(x), using a polynomial of first degree in m and a precomputed value of log($a_i$);
and further wherein said device being configured to compute an approximation to log(x) comprises said device being configured to compute an approximation written as:

$$y=-\log(x) \approx b_i+c_i \Delta x+e \times \log(2)$$

for i=0, . . . ,N−1
where:

$$b_i = -\log(a_i) + \left(\frac{1}{4a_iN}\right)^2 - \left(1 + \frac{1}{2N}\right)\frac{1}{a_i}; \text{ and}$$

$$c_i=-1/a_i;$$

and said device further configured to precompute a value for log(2); and
for each i, to precompute each value of $b_i$ and $c_i$.
14. A computing device in accordance with claim 13 further configured to store the precomputed values of $b_i$ and $c_i$ in a look-up table.
15. A method for computing an approximation of a natural logarithm function comprising the steps of:
partitioning an interval between 1 and 2 into N equally spaced sub-regions;
precomputing a reference point $a_i$ of each of the N equally spaced sub-regions, where i=0, . . . ,N−1;
selecting N sufficiently large so that, for each sub-region, a first degree polynomial in m computes log(m) to within a preselected degree of accuracy for any m within the sub-region, where m is a binary mantissa of a binary floating point representation of a variable x;

computing a value of log(x) for a binary floating point representation of x stored in a memory of a computing device utilizing the first degree polynomial in the binary mantissa m, wherein log(x) is a function of a distance between the reference point $a_i$ and the binary mantissa m;

generating an image by using the computed value of log(x);

wherein x has a binary exponent e in addition to the binary mantissa m;

and further wherein computing a value of log(x) for the binary floating point representation of x comprises the steps of:

partitioning the binary mantissa m of a binary representation of x in a memory, the representation of x including a binary exponent e and the binary mantissa m, wherein a first, most significant part of the partition corresponds to a region i and a second, less significant part of the partition corresponds to a region $\Delta x$, where $\Delta x$ is a distance from the binary mantissa m to the reference point $$a_i = 1 + \frac{i+0.5}{N}; \text{ and}$$

computing an approximation to log(x), using the first degree polynomial in the binary mantissa m and a precomputed value of log($a_i$);

wherein computing the approximation to log(x) comprises the step of computing an approximation written as:

$$\log(m) \approx \log(a_i) + \frac{(m-a_i)}{a_i};$$

where the reference point $a_i$ is a closest reference point to the binary mantissa m of x; and $1 \leq a_i < 2$.

16. A method in accordance with claim 15 wherein x is represented by a 32-bit representation having a sign bit, an 8-bit exponent, and a 23-bit binary mantissa having bits $b_{22}$ to $b_0$ in order of significance with $b_{22}$ being a bit of greatest significance; and the step of partitioning the binary mantissa m comprises the step of selecting a first group of bits $b_{22}$ through $b_{16}$ as index i and bits $b_{15}$ through $b_0$ as $\Delta x$.

17. A method in accordance with claim 15 utilized in a computed tomography (CT) scanner for generating an image of an object from acquired projection data of the object.

18. A method in accordance with claim 17 wherein said natural logarithm is used in an image reconstructor to generate the image of the object.

19. A method in accordance with claim 15 further comprising using the approximation to process at least one image of an object of interest.

20. A method in accordance with claim 15 wherein precomputing a reference point $a_i$ of each of the N equally spaced sub-regions comprising precomputing a centerpoint of each of the N equally spaced sub-regions.

21. A method for computing an approximation of a natural logarithm function comprising the steps of:

partitioning an interval between 1 and 2 into N equally spaced sub-regions;

precomputing a reference point $a_i$ of each of the N equally spaced sub-regions, where i=0, . . . ,N−1;

selecting N sufficiently large so that, for each sub-region, a first degree polynomial in m computes log(m) to within a preselected degree of accuracy for any m within the sub-region, where m is a binary mantissa of a binary floating point representation of a variable x;

computing a value of log(x) for a binary floating point representation of x stored in a memory of a computing device utilizing the first degree polynomial in the binary mantissa m, wherein log(x) is a function of a distance between the reference point $a_i$ and the binary mantissa m; and generating an image by using the computed value of log(x), wherein x has a binary exponent e in addition to the binary mantissa m;

and further wherein computing a value of log(x) for the binary floating point representation of x comprises the steps of:

partitioning the binary mantissa m of a binary representation of x in a memory, the representation of x including a binary exponent e and the binary mantissa m, wherein a first, most significant part of the partition corresponds to a region i and a second, less significant part of the partition corresponds to a region $\Delta x$, where $\Delta x$ is a distance from the binary mantissa m to the reference point $$a_i = 1 + \frac{i+0.5}{N}; \text{ and}$$

computing an approximation to log(x), using the first degree polynomial in the binary mantissa m and a precomputed value of log($a_i$);

wherein computing an approximation to log(x) comprises the step of computing an approximation written as:

$$y = -\log(x) \approx b_i + c_i \Delta x + e \times \log(2)$$

for i=0, . . . ,N−1
where:

$$b_i = -\log(a_i) + \left(\frac{1}{4a_i N}\right)^2 - \left(1 + \frac{1}{2N}\right)\frac{1}{a_i}; \text{ and}$$

$c_i = -1/a_i$.

22. A method for computing an approximation of a natural logarithm function comprising the steps of:

partitioning an interval between 1 and 2 into N equally spaced sub-regions;

precomputing a reference point $a_i$ of each of the N equally spaced sub-regions, where i=0, . . . ,N−1;

selecting N sufficiently large so that, for each sub-region, a first degree polynomial in m computes log(m) to within a preselected degree of accuracy for any m within the sub-region, where m is a binary mantissa of a binary floating point representation of a variable x;

computing a value of log(x) for a binary floating point representation of x stored in a memory of a computing device utilizing the first degree polynomial in the binary mantissa m, wherein log(x) is a function of a distance between the reference point $a_i$ and the binary mantissa m; and generating an image by using the computed value of log(x), wherein x has a binary exponent e in addition to the binary mantissa m;

wherein said method is utilized in a computed tomography (CT) scanner for generating an image of an object from acquired projection data of the object;

and further wherein computing a value of log(x) for the binary floating point representation of x comprises the steps of:

partitioning the binary mantissa m of a binary representation of x in a memory, the representation of x including a binary exponent e and the binary mantissa m, wherein a first, most significant part of the partition corresponds to a region i and a second, less significant part of the partition corresponds to a region $\Delta x$, where $\Delta x$ is a distance from the binary mantissa m to the reference point $$a_i = 1 + \frac{i+0.5}{N}; \text{ and}$$

computing an approximation to log(x), using the first degree polynomial in the binary mantissa m and a precomputed value of $\log(a_i)$;

and further wherein computing an approximation to log(x) comprises the step of computing an approximation written as:

$$y = -\log(x) \approx b_i + c_i \Delta x + e \times \log(2)$$

for i=0, . . . ,N−1
where:

$$b_i = -\log(a_i) + \left(\frac{1}{4a_i N}\right)^2 - \left(1 + \frac{1}{2N}\right)\frac{1}{a_i}; \text{ and}$$

$$c_i = -1/a_i.$$

23. A computing device comprising a memory in which binary floating point representations of particular numbers are stored, said device being configured to:

partition an interval between 1 and 2 into N equally spaced sub-regions;

precompute a reference point $a_i$ of each of the N equally spaced sub-regions, where i=0, . . . ,N−1, wherein N is sufficiently large so that, within each sub-region, a first degree polynomial in m computes log(m) to within a preselected degree of accuracy for any m within the sub-region, where m is a mantissa of a binary floating point representation of a variable x;

compute a value of log(x) for a binary floating point representation of x stored in said memory utilizing the first degree polynomial in the binary mantissa m, wherein log(x) is a function of a distance between the reference point $a_i$ and the binary mantissa m; and generate an image by using the computed value of log(x), wherein x has a binary exponent e in addition to the binary mantissa m;

and wherein said device being configured to compute a value of log(x) for the binary floating point representation of x comprises said device being configured to:

partition the binary mantissa m of a binary representation of x in a memory of said device, the representation of x including a binary exponent e and the binary mantissa m, wherein a first, most significant part of the partition corresponds to a region i and a second, less significant part of the partition corresponds to a region $\Delta x$, where $\Delta x$ is a distance from the binary mantissa m to the reference point $$a_i = 1 + \frac{i+0.5}{N}; \text{ and}$$

compute an approximation to log(x), using a polynomial of first degree in m and a precomputed value of $\log(a_i)$;

and further wherein said device being configured to compute an approximation to log(x) comprises said device being configured to compute an approximation written as:

$$y = -\log(x) \approx b_i + c_i \Delta x + e \times \log(2)$$

for i=0, . . . ,N−1
where:

$$b_i = -\log(a_i) + \left(\frac{1}{4a_i N}\right)^2 - \left(1 + \frac{1}{2N}\right)\frac{1}{a_i}; \text{ and}$$

$$c_i = -1/a_i.$$

24. A computing device comprising a memory in which binary floating point representations of particular numbers are stored, said device being configured to:

partition an interval between 1 and 2 into N equally spaced sub-regions;

precompute a reference point $a_i$ of each of the N equally spaced sub-regions, where i=0, . . . ,N−1, wherein N is sufficiently large so that, within each sub-region, a first degree polynomial in m computes log(m) to within a preselected degree of accuracy for any m within the sub-region, where m is a mantissa of a binary floating point representation of a variable x;

compute a value of log(x) for a binary floating point representation of x stored in said memory utilizing the first degree polynomial in the binary mantissa m, wherein log(x) is a function of a distance between the reference point $a_i$ and the binary mantissa m; and generate an image by using the computed value of log(x), wherein x is stored with a binary exponent e in addition to the binary mantissa m; said device in a computed tomography (CT) scanner and utilized by said CT scanner for calculating logarithms when said CT scanner generates an image of an object from acquired projection data of the object;

and further wherein said device being configured to compute a value of log(x) for the binary floating point representation of x comprises said device being configured to:

partition the binary mantissa m of a binary representation of x in a memory, the representation of x including a binary exponent e and the binary mantissa m, wherein a first, most significant part of the partition corresponds to a region i and a second, less significant part of the partition corresponds to a region Δx, where Δx is a distance from mantissa m to reference point $$a_i = 1 + \frac{i+0.5}{N}; \text{ and}$$

compute an approximation to log(x), using a polynomial of first degree in m and a precomputed value of log($a_i$); and further wherein said device being configured to compute an approximation to log(x) comprises said device being configured to compute an approximation written as:

$$y = -\log(x) \approx b_i + c_i \Delta x + e \times \log(2)$$

for i=0, . . . ,N−1
where:

$$b_i = -\log(a_i) + \left(\frac{1}{4a_iN}\right)^2 - \left(1 + \frac{1}{2N}\right)\frac{1}{a_i}; \text{ and}$$

$$c_i = -1/a_i.$$

* * * * *